US009621734B2

(12) United States Patent
Petricoin, Jr.

(10) Patent No.: US 9,621,734 B2
(45) Date of Patent: Apr. 11, 2017

(54) VOIP LINE SEIZURE SYSTEM AND METHOD

(75) Inventor: Dennis Michael Petricoin, Jr., Hemlock, NY (US)

(73) Assignee: Robert Bosch GmbH, Stuttgart (DE)

( * ) Notice: Subject to any disclaimer, the term of this patent is extended or adjusted under 35 U.S.C. 154(b) by 1920 days.

(21) Appl. No.: 12/168,597

(22) Filed: Jul. 7, 2008

(65) Prior Publication Data

US 2010/0002680 A1 Jan. 7, 2010

(51) Int. Cl.
| | | |
|---|---|---|
| *H04M 7/00* | (2006.01) | |
| *H04L 29/06* | (2006.01) | |
| *H04M 1/738* | (2006.01) | |
| *H04M 11/04* | (2006.01) | |
| *H04M 1/253* | (2006.01) | |
| *H04L 12/64* | (2006.01) | |

(52) U.S. Cl.
CPC ...... *H04M 7/0069* (2013.01); *H04L 65/1026* (2013.01); *H04M 1/2535* (2013.01); *H04M 1/738* (2013.01); *H04M 11/04* (2013.01); *H04L 2012/6429* (2013.01); *H04M 2242/04* (2013.01)

(58) Field of Classification Search
CPC ......... H04L 12/2803; H04L 2012/6429; H04L 65/1026; H04M 7/0069; H04M 11/04; H04M 2242/04; H04M 1/2535; H04M 1/738
USPC .......... 370/260, 352–356; 379/37, 39, 46–51
See application file for complete search history.

(56) References Cited

U.S. PATENT DOCUMENTS

| | | | | |
|---|---|---|---|---|
| 5,018,190 | A * | 5/1991 | Walker et al. | 379/93.02 |
| 6,067,346 | A * | 5/2000 | Akhteruzzaman et al. | 379/39 |
| 6,141,341 | A * | 10/2000 | Jones et al. | 370/352 |
| 6,584,108 | B1 * | 6/2003 | Chung et al. | 370/401 |
| 6,801,540 | B1 * | 10/2004 | Jeong | 370/466 |
| 6,850,601 | B2 * | 2/2005 | Jones et al. | 379/45 |
| 7,085,551 | B1 * | 8/2006 | Bonner et al. | 455/404.1 |
| 7,391,762 | B2 * | 6/2008 | Ko | 370/352 |
| 7,853,199 | B2 * | 12/2010 | Blum | 455/3.05 |
| 8,199,743 | B1 * | 6/2012 | Sylvain | 370/352 |
| 8,228,907 | B2 * | 7/2012 | Rosen | 370/356 |
| 8,451,986 | B2 * | 5/2013 | Cohn | H04L 12/12 340/539.14 |
| 9,049,307 | B2 * | 6/2015 | Tyroler | G01D 21/00 |
| 2004/0086093 | A1 | 5/2004 | Schranz | |
| 2005/0041642 | A1 * | 2/2005 | Robinson | 370/352 |
| 2006/0007915 | A1 * | 1/2006 | Frame | 370/352 |
| 2006/0067484 | A1 | 3/2006 | Elliot et al. | |
| 2006/0209857 | A1 * | 9/2006 | Hicks, III | 370/401 |
| 2006/0239250 | A1 | 10/2006 | Elliot et al. | |
| 2006/0239418 | A1 * | 10/2006 | Erb | 379/45 |
| 2007/0001818 | A1 | 1/2007 | Small et al. | |

(Continued)

*Primary Examiner* — Parth Patel
*Assistant Examiner* — Kai Chang
(74) *Attorney, Agent, or Firm* — Michael Best & Friedrich LLP

(57) ABSTRACT

A system for yielding control of a network to a device configured to operate on a PSTN. The system includes a network configured to couple one or more devices to a PSTN, and a PSTN telephone, a PSTN security system, and an ATA and modem coupled to the network. The ATA and modem are configured to provide a VoIP interface between the network and the Internet and to provide a dial tone to the network. An access detector is coupled to the network to detect when the security system attempts to use the network.

22 Claims, 7 Drawing Sheets

(56) References Cited

U.S. PATENT DOCUMENTS

2007/0211877 A1 9/2007 Martin et al.
2008/0020648 A1 1/2008 Jones

* cited by examiner

VOIP LINE SEIZURE SYSTEM AND METHOD

BACKGROUND

Many building fire and/or security systems (hereinafter referred to simply as security systems) are configured to contact emergency personnel (e.g., police, fire fighters, security officers, etc.) to report an abnormal or alarm event (e.g., a fire, a break-in, etc.) at a building. While some security systems are configured to contact the emergency personnel via a wireless or cellular interface, the majority use a public switched telephone network (PSTN), also known as a plain old telephone system (POTS), to contact emergency personnel. The security systems generally connect to a building's internal telephone network, and when a fire, break-in, or similar event occurs, the security system takes control of the PSTN, disconnecting all other devices connected to the PSTN. For example, if a user is using a telephone line (e.g., sending a fax, making a telephone call, etc.), the security system disconnects the internal telephone network, including the user, from the PSTN and takes control of the system to make its call.

FIG. 1 schematically illustrates a building 100 including a building telephone network 105. A plurality of devices 110 (e.g., telephones, fax machines, etc.) are connected to the wired telephone network 105. The telephone network 105 also connects to a PSTN 115 external to the building 100 through an interface 116. A security system 120 including a controller 125, one or more sensors 130, and a switch 135 is also connected to the telephone network 105 via a first connection 140 of the switch 135. A second connection 145 of the switch 135 is connected to the PSTN 115 through the interface 116. Thus, all of the devices 110 in the building 100 connect to the PSTN 115 through the security system switch 135. The security system 120 also includes a PSTN connection 150 connected to the PSTN 115 through the interface 116. When an alarm condition is detected by one of the sensors 130, the controller 125 "seizes" control of the PSTN 115 by opening the switch 135, and disconnecting the devices 110 from the PSTN 115. This "seizure" enables the security system 120 to contact authorized personnel immediately, even if other devices 110 are connected to the PSTN 115.

FIG. 2 illustrates a prior-art construction of a voice over internet protocol (VoIP) telephone system 200. The system is the same as the system shown in FIG. 1, except that the connection of the telephone network 105 to the PSTN 115 is severed (as illustrated by the "X"). In the construction shown, the telephone network 105 is connected to an analog telephone adapter (ATA) 205, which in turn is connected to a modem 210 (or computer). The modem 210 is then connected to the Internet 215. The ATA 205 and modem 210 form a VoIP interface 220 linking the PSTN devices 110 to the Internet 215, and enabling the devices 110 to communicate via the Internet 215 instead of the PSTN 115. The ATA 205 is configured to be installed anywhere on the telephone network 105, but in order to reduce installation cost and effort, the ATA 205 is often installed proximate the building's Internet interface (e.g., the modem 210).

SUMMARY

A PSTN security system 120, used in the building 100 having the VoIP telephone system 200, is disconnected from the building's telephone network 105 (as illustrated by the "X"), but remains connected to the PSTN 115 through the interface 116. Therefore, devices 110 in the building, use the VoIP interface 220 to communicate over the Internet 215, while the security system uses the PSTN 115. This results in increased costs as a connection to the PSTN 115 must be maintained for the security system 120. As a consequence, what is needed is a system where a security system can gain control of a premises' telephone network when necessary to make a telephone call over a VoIP system.

In one embodiment, the invention provides a system for yielding control of a network to a device configured to operate on a PSTN. The system includes a network configured to couple one or more devices to a PSTN, and a first device (e.g., a telephone), a second device (e.g., a security system), a third device (e.g., an ATA and a modem), and a fourth device (e.g., an access detector) coupled to the network. The first and second devices are configured to operate on the PSTN. The third device is configured to provide a VoIP interface between the network and the Internet and to provide a dial tone to the network. The fourth device is configured to detect when the second device attempts to use the network.

In another embodiment the invention provides a method of seizing control of a network configured to interface with a PSTN. The method includes the acts of transmitting, by a first device, a sequence of DTMF signals over the network, detecting the sequence of DTMF signals, disconnecting a second device from the network when the detected sequence of DTMF signals matches a predetermined sequence of DTMF signals, and communicating, by the first device, over the network following disconnecting the second device from the network.

In another embodiment the invention provides a VoIP security system including a network having a first wire and a second wire, and a security system, a PSTN telephone, and a VoIP interface coupled to the first wire and the second wire. The security system is configured to operate on a PSTN. The system also includes a device configured to disconnect the PSTN telephone from at least one of the first wire and the second wire based on a signal which indicates that the security system is accessing the network.

In another embodiment the invention provides a system for yielding control of a network to a device configured to operate on a PSTN. The system includes a network configured to couple one or more devices to a PSTN, and a telephone, a security system, an ATA and modem, and an access detector coupled to the network. The telephone and security system are configured to operate on the PSTN. The ATA and modem are configured to provide a VoIP interface between the network and the Internet and to provide a dial tone to the network. The access detector is configured to detect when the security system attempts to use the network.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
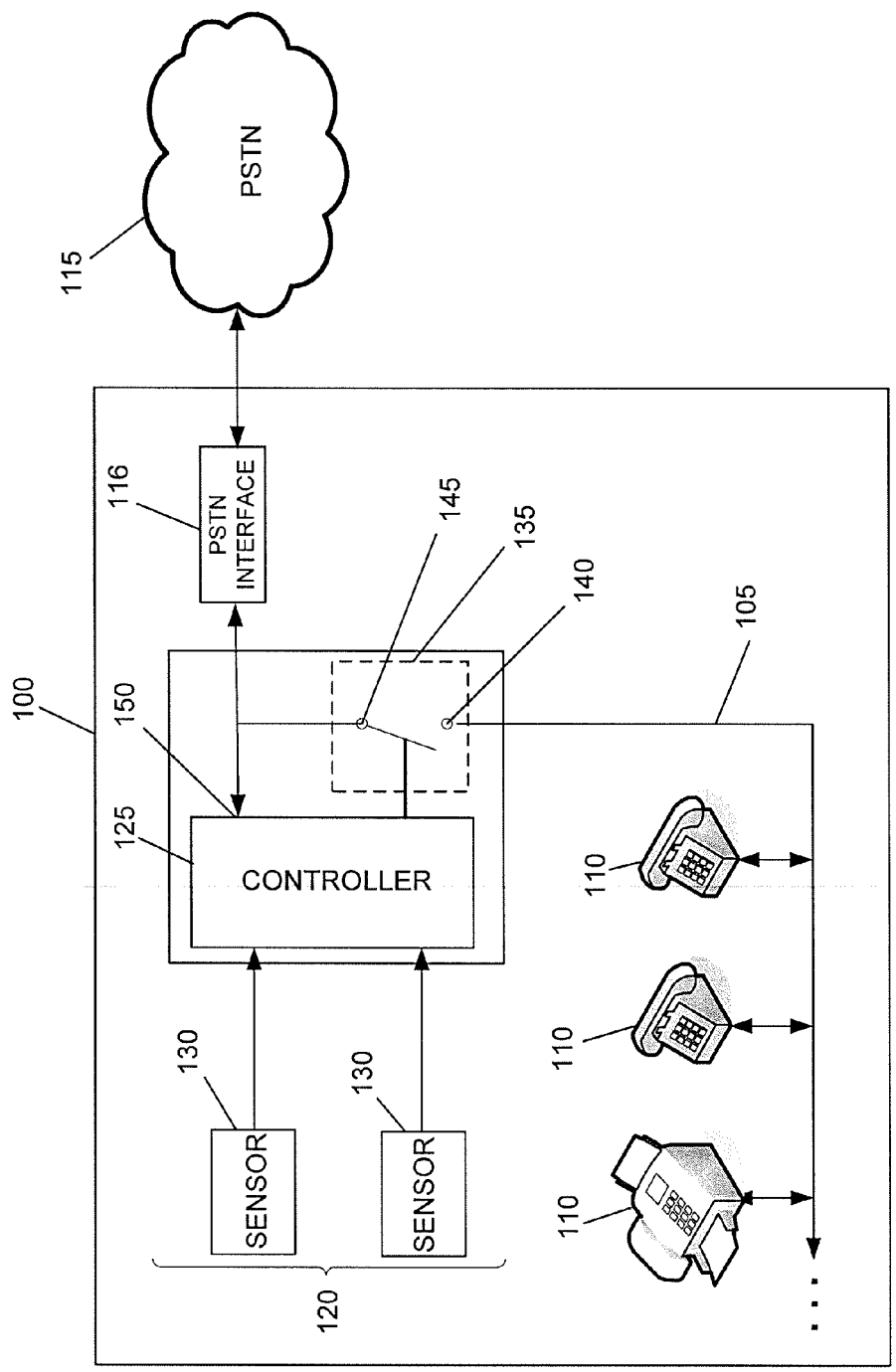
FIG. 1 is a schematic representation of a prior-art building telephone system including a security system.
Figure 2:
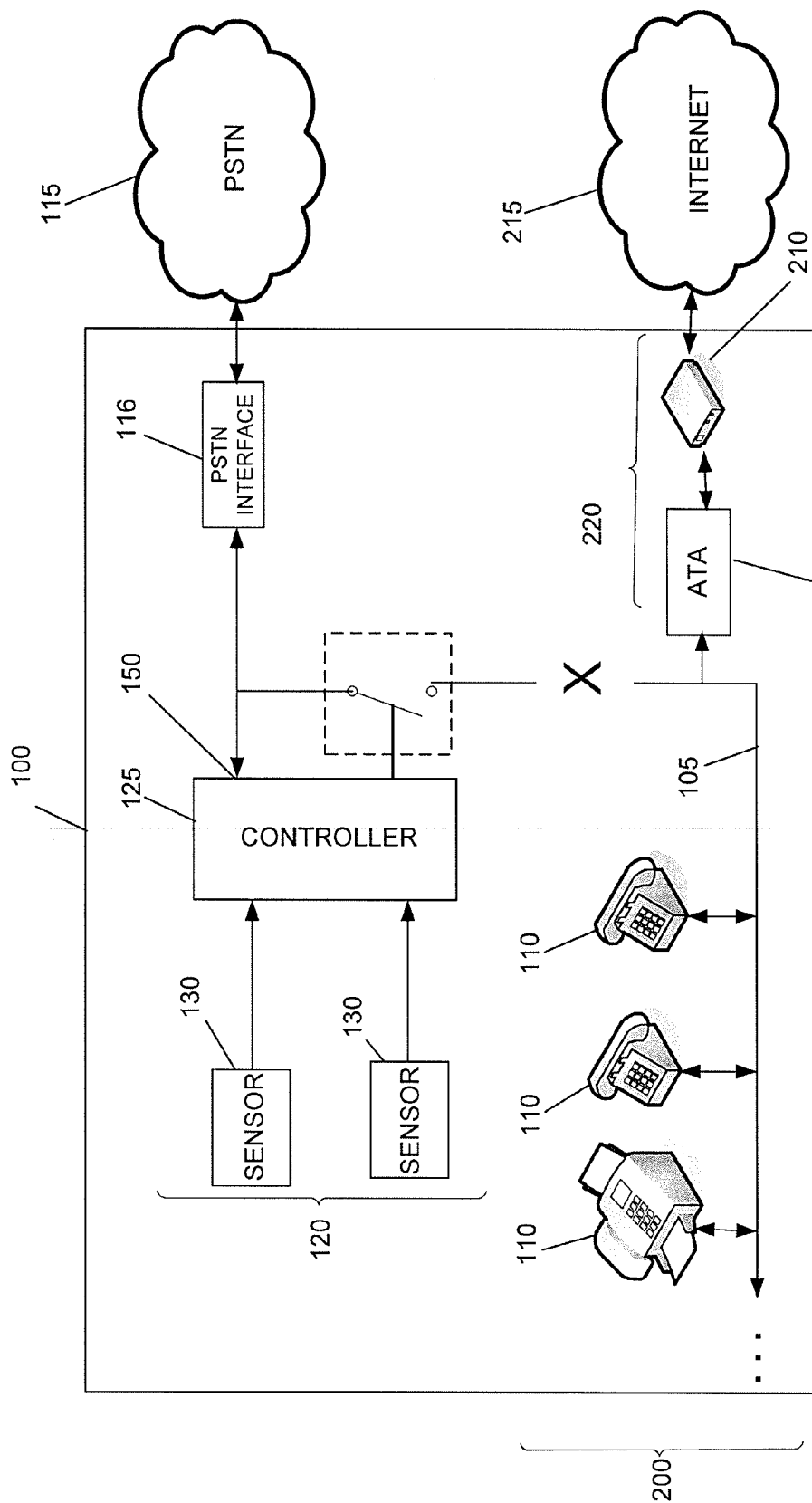
FIG. 2 is a schematic representation of the prior-art VoIP telephone system and a security system connected to a PSTN.
Figure 3:
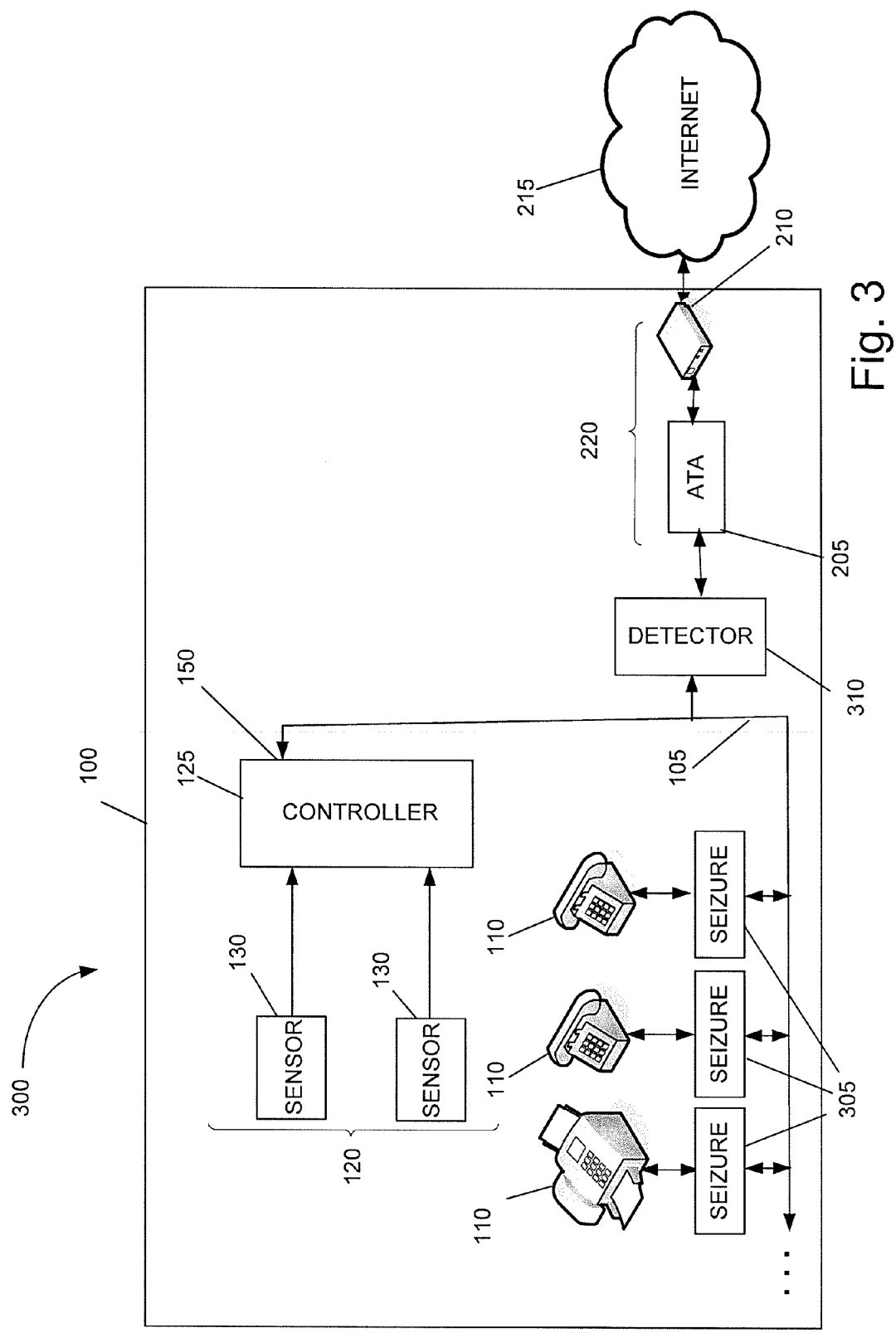
FIG. 3 is a schematic representation of a construction of a VoIP telephone system configured to enable a security system to "seize" the system according to the invention.

FIG. 3 illustrates a construction of a system 300 enabling a PSTN compatible security system 120 having a PSTN connection 150 to gain control of a building telephone network 105, and use a VoIP interface 220 to contact emergency personnel at a remote location. The system 300 includes, in addition to the security system 120 and the telephone network 105, one or more devices 110 (e.g., a telephone, a fax machine, etc.), one or more seizure devices 305, an access detector 310, an ATA 205, and a modem 210. In the construction shown, each device 110 has an associated seizure device 305. However, in other constructions, one or more devices 110 can connect to a single seizure device 305. The modem 210 connects to the Internet 215, and the ATA 205 converts analog PSTN compatible signals, from the devices 110 and the security system 120, into digital signals compatible with the modem 210. The ATA 205 also performs additional functions such as packetizing digital information and generating a dial tone. In some constructions, the seizure device is integrated within one or more of the devices 110.

Figure 4:
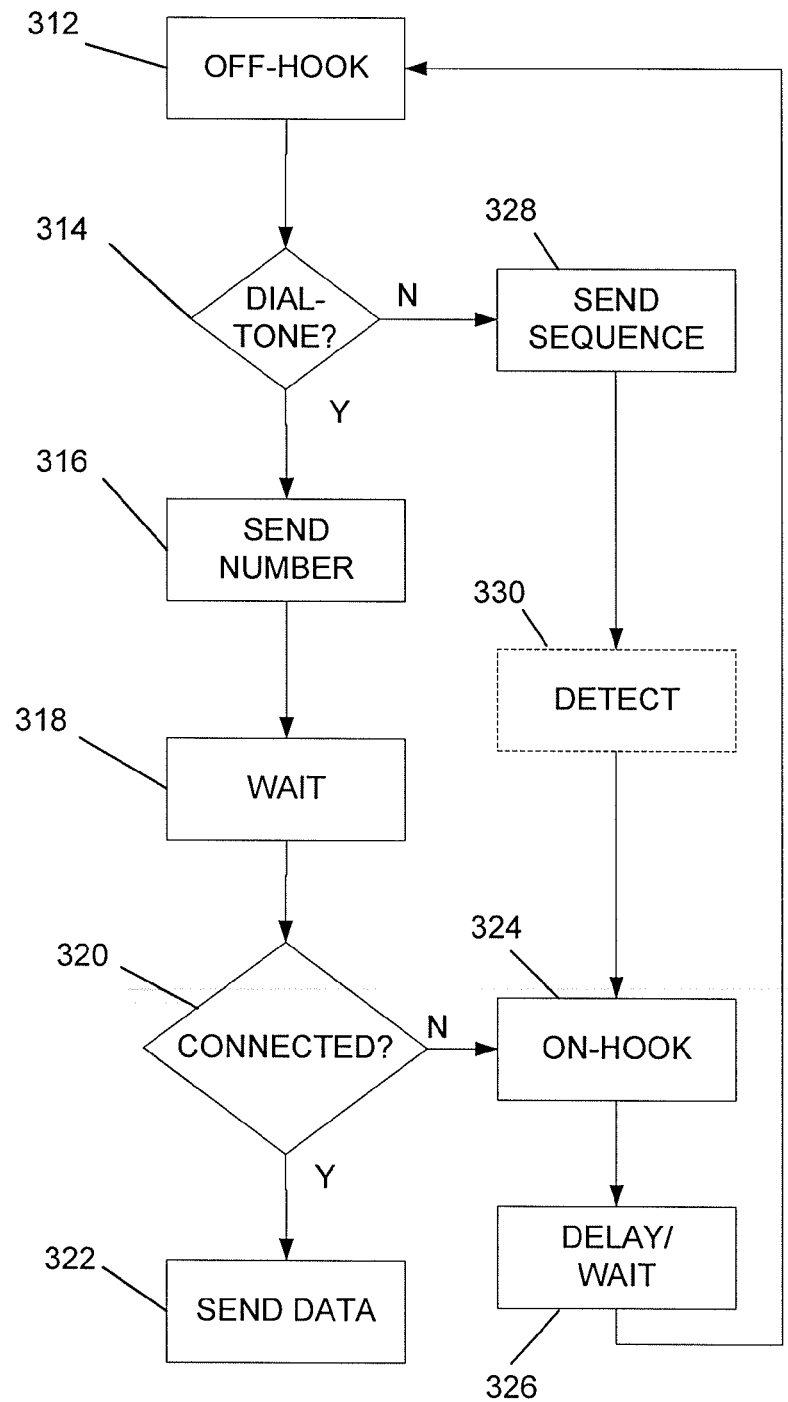
FIG. 4 is a flow chart of the operation of an embodiment of the VoIP telephone system of FIG. 3.

FIG. 4 illustrates the operation of an embodiment of the system 300. When the security system 120 detects an alarm event, the security system 120 generates a signal on the telephone network 105 (e.g., initiates an "off-hook" condition) (step 312) to access the telephone network 105. The security system 120 then checks if a dial tone is being generated on the telephone network 105 by the ATA 205 (step 314). If no other devices are using the telephone network 105, the ATA 205 generates the dial tone in response to the off-hook condition, and the security system 120 continues by generating a sequence of dual-tone, multi-frequency (DTMF) signals corresponding to a telephone number of a remote location the security system 120 is trying to contact (step 316). The security system 120 then waits (step 318) for a connection to be made to the remote location. If the connection is made (step 320), the security system 120 sends data (or a message) relating to the alarm event to the remote location (step 322).

If, at step 320, a connection is not completed in a predetermined time period, the security system 120 disconnects the security system 120 from the telephone network 105 (e.g., initiates an "on-hook" condition) (step 324), pauses or waits for a period of time to allow the telephone network 105 and ATA 205 to reset (step 326) and repeats the process beginning at step 312.

If, at step 314, another device 110 is using the telephone network 105, the ATA 205 does not generate a dial tone. The security system 120, upon not receiving the dial tone in response to its "off-hook" condition, sends a predetermined sequence of DTMF signals (step 328) to indicate that the security system 120 desires to access the telephone network 105. The access detector 310 detects the sequence of DTMF signals (step 330), and causes the devices 110 to disconnect from the telephone network 105 as described below. The security system 120 then initiates an "on-hook" condition (step 324), delays or waits (step 326), and repeats the process at step 312, at which time the device(s) 110 using the telephone network 105 are disconnected and the security system 120 receives a dial tone at step 314.

Figure 5:
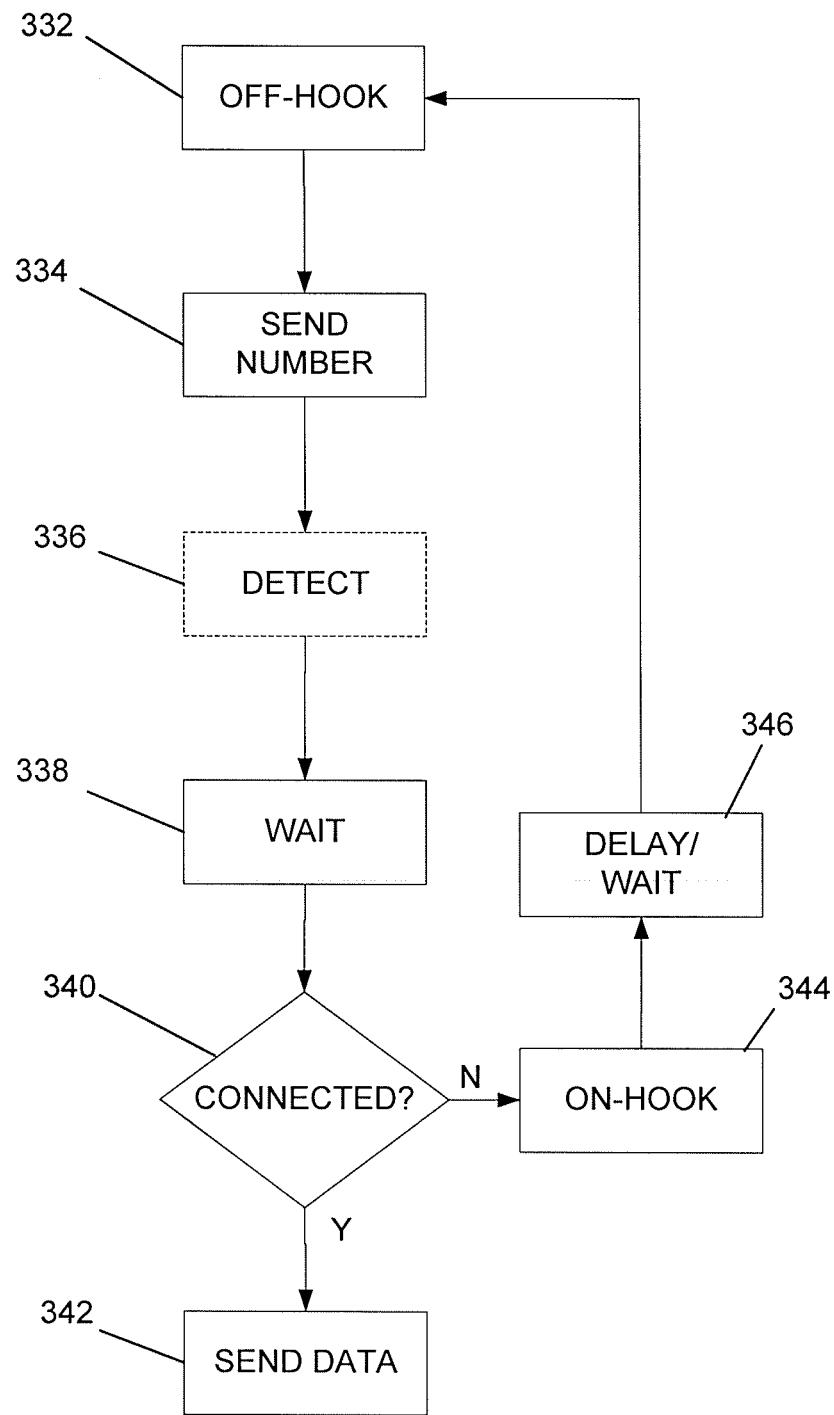
FIG. 5 is a flow chart of the operation of an alternate embodiment of the VoIP telephone system of FIG. 3.

FIG. 5 illustrates the operation of another embodiment of the system 300. When the security system 120 detects an alarm event, the security system 120 initiates an "off-hook" condition (step 332) to access the telephone network 105. In this embodiment, the security system 120 does not check for a dial tone. Instead, the security system 120 continues by generating a sequence of DTMF signals corresponding to a telephone number of a remote location the security system 120 is trying to contact (step 334). If another device 110 is using the telephone network 105, the access detector 310 detects the sequence of DTMF signals (step 336) and causes the devices 110 to disconnect from the telephone network 105 as described below.

The security system 120 waits (step 338) for a connection to be made to the remote location, whether or not another device was using the telephone network 105. If the connection is made (step 340), the security system 120 sends data relating to the event to the remote location (step 342).

If, at step 340, a connection is not completed in a predetermined time period, either because the telephone network 105 is being used by another device 110 or some other reason, the security system 120 initiates an "on-hook" condition (step 344), waits for a period of time to allow the telephone network 105 and ATA 205 to reset (step 346) and repeats the process beginning at step 332, at which time if another device 110 was using the telephone network 105, it is disconnected and the security system's call is completed.

In the construction shown in FIG. 3, the access detector 310 is connected between the ATA 205 and the telephone network 105, and is configured to monitor the telephone network 105 for DTMF signals. The access detector 310 detects when the security system 120 is attempting to access the telephone network 105 by recognizing the sequence of DTMF signals produced by the security system 120. In another embodiment (as described above with respect to FIG. 5), whenever the access detector 310 detects any sequence of DTMF signals on the telephone network 105, while the telephone network 105 is being used, the access detector 310 assumes that the security system 120 is attempting to access the telephone network 105. In some embodiments, the access detector 310 determines that the security system 120 is attempting to access the telephone network 105 by detecting when the security system 120 initiates an "off-hook" condition (e.g., by monitoring voltage levels on the telephone network 105 or at the PSTN connection 150 of the security system 120) while another device 110 is using the telephone network 105.

If the access detector 310 detects that the security system 120 is attempting to access the telephone network 105 while another device 110 (e.g., the telephone) is using the telephone network 105, the access detector 310 sends a disconnect signal to the seizure devices 305 directing the seizure devices 305 to disconnect their respective devices 110 from the telephone network 105. In some embodiments, the access detector 310 sends the disconnect signal continuously until the security system 120 is no longer using the telephone network 105. In other embodiments, the access detector 310 sends the disconnect signal for a period of time (e.g., until the security system 120 has connected to the remote location). The seizure device 305, upon receiving the disconnect signal, disconnects the device 110 from the telephone network 105. In some embodiments, the seizure device 305 automatically reconnects the device 110 to the telephone network 105 at the expiration of a period of time. If the security system 120 is still using the telephone network 105, the device 110 is unable to receive a dial tone, and, therefore, use the telephone network 105 until the security system 120 is no longer using the telephone network 105. In other embodiments, the access detector 310 sends a reconnect signal when the access detector 310 detects that the security system 120 is no longer using the telephone network 105. In these embodiments, the seizure device 305 keeps the device 110 disconnected until the seizure device 305 receives the reconnect signal.

Figure 6:
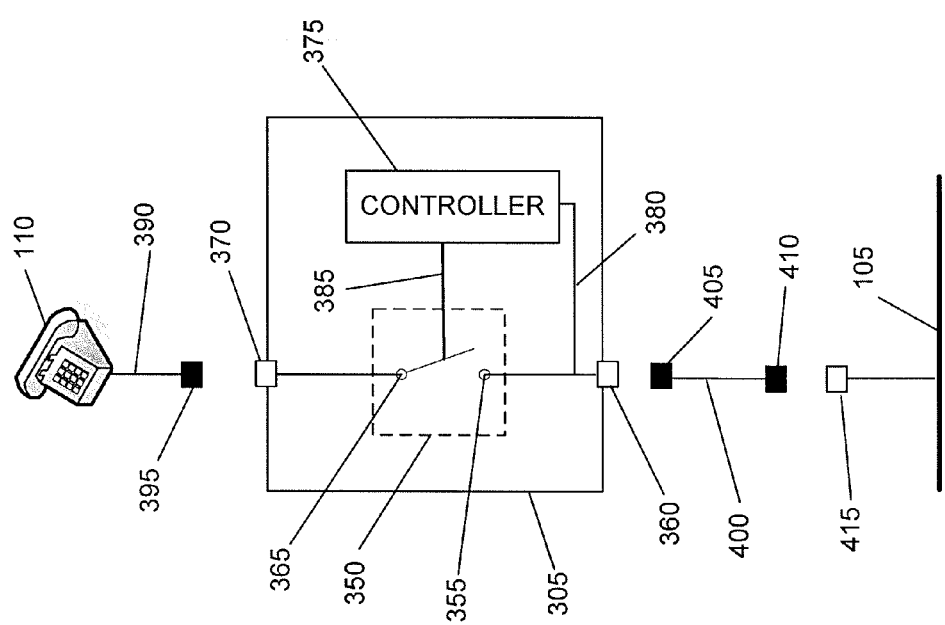
FIG. 6 is a schematic representation of a seizure device.

In one construction, schematically shown in FIG. 6, the seizure device 305 includes a switch 350 having a first terminal 355 coupled to a first RJ11 socket or jack 360, a second terminal 365 coupled to a second RJ11 jack 370, and a controller 375. The controller 375 is connected, at line 380, to the first RJ11 jack 360. The controller 375 is also connected to the switch 350 by line 385. The controller 375 controls the opening and closing of the switch 350 using line 385.

In the construction shown, the device 110 connects to the seizure device 305 by a cable 390 (the cable 390 can be integrated into the device 110 or a separate, stand alone, cable that plugs into the device 110). The cable 390 includes a male RJ11 connector or plug 395 that is plugged into the second RJ11 jack 370. A standard telephone cable 400 (e.g., having two RJ11 plugs 405 and 410) is used to connect the seizure device 305 to an RJ11 jack 415 that is connected to the telephone network 105. Alternatively, the seizure device 305 can have an integrated cable including a RJ11 plug 410 for connecting to the telephone network 105.

When the controller 375 detects the disconnect signal on its first line 380, the controller 375 provides a signal on line 385 to open the switch 350. As discussed above, the controller 375 can provide the signal to open the switch 350 continuously, as long as the controller 350 receives the disconnect signal from the access detector 310 or, in other embodiments, can provide the signal to open the switch 350 for a predetermined time period or until a reconnect signal is received from the access detector 310.

Figure 8:
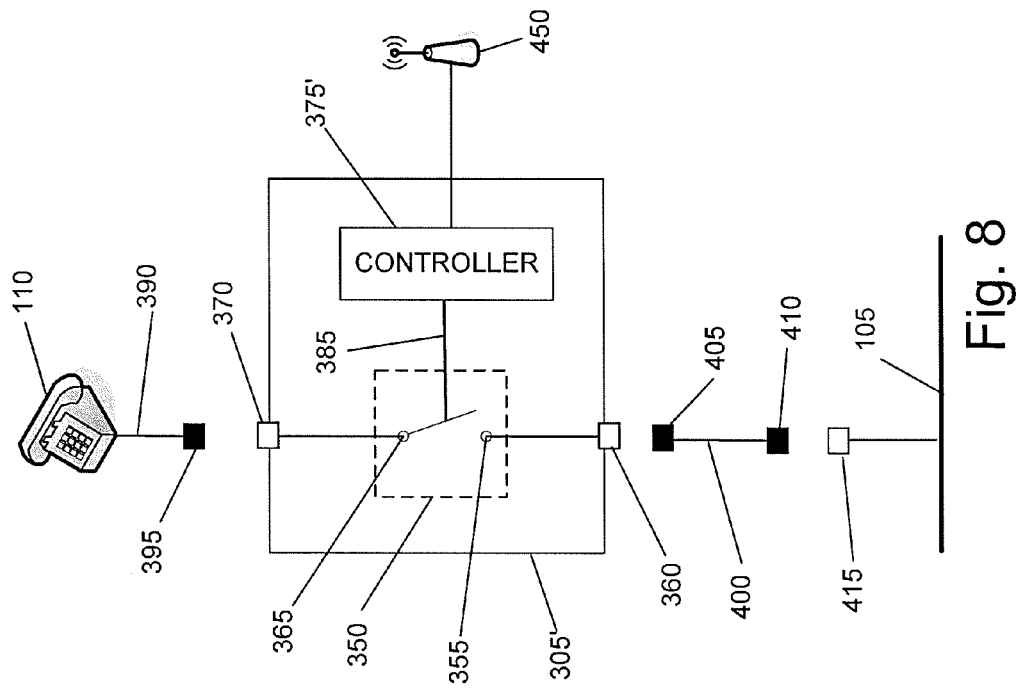
FIG. 8 is a schematic representation of a seizure device for use in the VoIP telephone system of FIG. 7.
Figure 7:
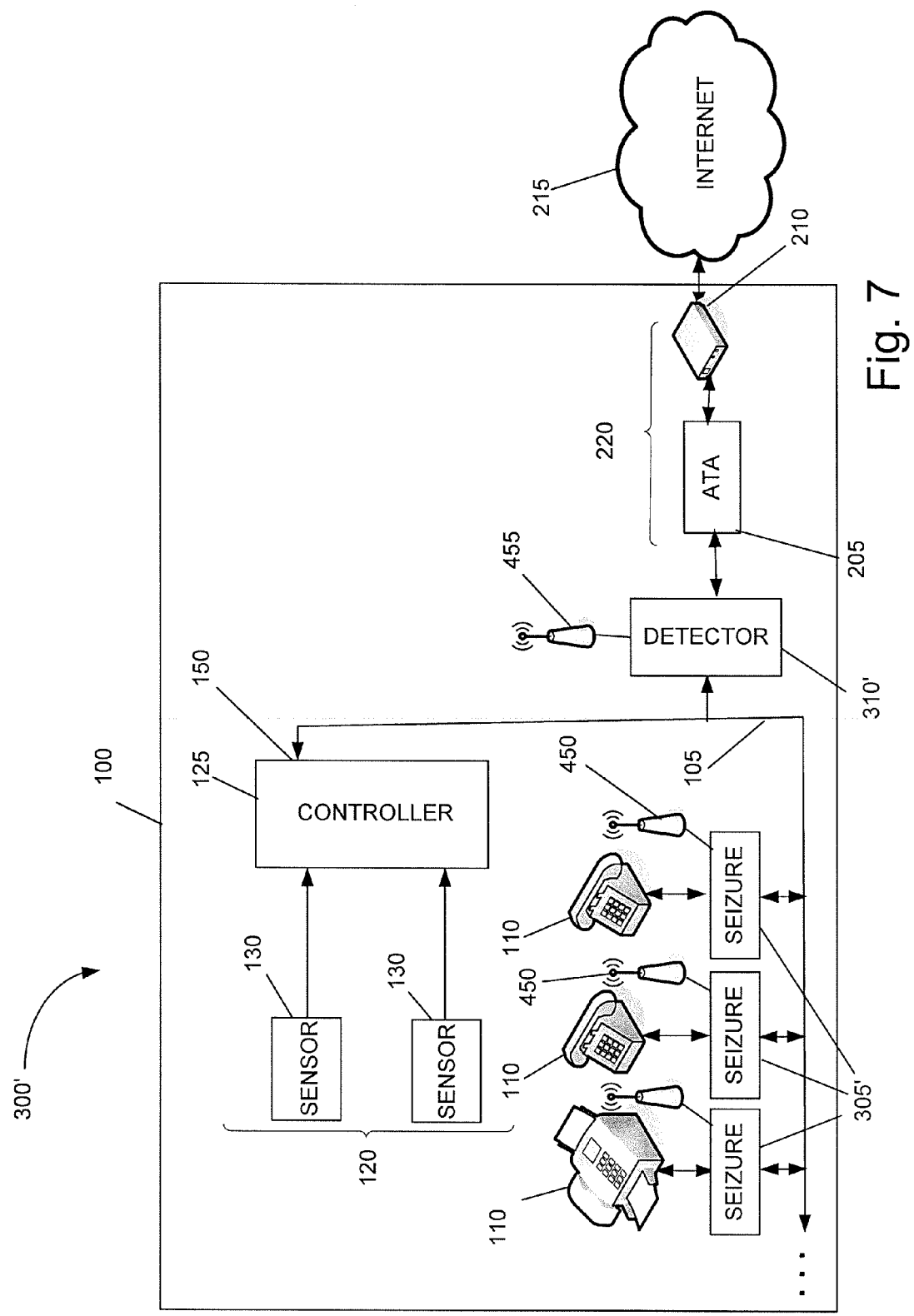
FIG. 7 is a schematic representation of an alternate construction of the VoIP telephone system of FIG. 3.

FIGS. 7 and 8 illustrate alternative constructions of a system 300' and a seizure device 305'. The seizure device 305' is the same as the seizure device 305 of FIG. 6 except that the controller 375' includes a wireless interface 450. The controller 375' receives the disconnect signal (and the reconnect signal if appropriate) via the wireless interface 450 from a wireless interface 455 of an access detector 310', opening and closing the switch 350 based on the signal(s).

In an alternate embodiment, each seizure device 305 includes the access detector 310, and detects when the security system 120 is attempting to access the telephone network 105. The seizure device 305 then disconnects from the telephone network 105 as described above. In some embodiments, the security system 120 includes and/or operates as the access detector 310, sending the disconnect signal (e.g., wired or wirelessly) to the seizure device 305 to disconnect the devices 110 from the telephone network 105 as described above.

In some embodiments, one or more of the devices 110 connected to the telephone network 105 incorporate the seizure device 305 and/or the access detector 310. In other embodiments, the access detector 310 is incorporated in the ATA 205.

Various features and advantages of the invention are set forth in the following claims.

What is claimed is:

1. A system for yielding control of a network to a device configured to operate on a PSTN, the system comprising:
    a network configured to couple one or more devices to the PSTN;
    a first device coupled to the network and configured to operate on the PSTN;
    a second device coupled to the network and configured to operate on the PSTN;
    a third device coupled to the network, configured to provide a VoIP interface between the network and the Internet and to provide a dial tone to the network; and
    a fourth device coupled between the network and the third device, and configured to detect when the second device attempts to use the network during a time when the first device is using the network.

2. The system of claim 1, wherein the third device and the fourth device are incorporated into a single device.

3. The system of claim 1, wherein the fourth device detects that the second device is attempting to access the network based on detecting a sequence of DTMF signals on the network.

4. The system of claim 1, wherein the second device generates a predetermined sequence of DTMF signals when attempting to access the network.

5. The system of claim 4, wherein the sequence of DTMF signals corresponds to a telephone number of a remote location.

6. The system of claim 1, wherein the fourth device determines that the second device is attempting to access the network when the fourth device detects the predetermined sequence of DTMF signals.

7. The system of claim 1, wherein the fourth device transmits a signal when the fourth device detects the second device attempting to access the network.

8. The system of claim 7, wherein the signal is a wireless signal.

9. The system of claim 7, wherein the first device is disconnected from the network when the fourth device transmits the signal.

10. The system of claim 9, wherein the fourth device sends a second signal when the second device is no longer using the network and the first device is reconnected to the network when the fourth device transmits the second signal.

11. The system of claim 7, further comprising a fifth device connected between the first device and the network, the fifth device disconnecting the first device when the fifth device receives the signal.

12. The system of claim 1, wherein the fourth device is incorporated in the first device.

13. The system of claim 1, wherein the fourth device sends the signal as long as the second device is using the network.

14. The system of claim 1, wherein the second device generates the predetermined sequence of DTMF signals when the second device detects that the first device is using the network.

15. A method of seizing control of a network configured to interface with a PSTN, the method comprising:
    transmitting, by a first device, a sequence of DTMF signals over the network;
    detecting the sequence of DTMF signals;
    disconnecting a second device from the network when the detected sequence of DTMF signals matches a predetermined sequence of DTMF signals; and communicating, by the first device, over the network following the disconnecting of the second device from the network.

16. The method of claim 15, further comprising, transmitting a disconnect signal when the sequence of numbers matches the predetermined sequence of DTMF signals.

17. The method of claim 15, further comprising, transmitting a reconnect signal when the first device finishes communicating over the network.

18. The method of claim 17, further comprising receiving the reconnect signal and reconnecting the second device to the network following receiving the reconnect signal.

19. A VoIP security system, comprising:
a network comprising a first wire and a second wire;
a security system configured to operate on a PSTN, the security system coupled to the first wire and the second wire;
a PSTN telephone coupled to the first wire and the second wire and configured to operate on the PSTN;
a VoIP interface device coupled to the first wire and the second wire, configured to provide a VoIP interface between the network and the Internet and to provide a dial tone to the network;
a detector coupled to the first and the second wire, configured to detect when the security system attempts to access the network and send a signal indicating that the security system is attempting to access the network during a time when the PSTN telephone is using the network; and
a device coupled to the first and the second wire, configured to disconnect the PSTN telephone from at least one of the first wire and the second wire based on the signal.

20. The VoIP security system of claim 19, further comprising an access detector configured to detect the security system attempting to access the network and to generate the signal when the security system is attempting to access the network.

21. The VoIP security system of claim 20, wherein the access detector generates a second signal when the security system finishes accessing the network, the device reconnecting the telephone to the network upon receiving the second signal.

22. A system for yielding control of a network to a device configured to operate on a PSTN, the system comprising:
a network configured to couple one or more devices to a PSTN;
a telephone coupled to the network and configured to operate on the PSTN;
a security system coupled to the network and configured to operate on the PSTN;
an access detector coupled to the network and configured to detect when the security system attempts to use the network during a time when the telephone is using the network; and
an ATA and modem coupled to the network via the access detector and configured to provide a VoIP interface between the network and the Internet and to provide a dial tone to the network.

\* \* \* \* \*